US007211549B2

(12) United States Patent
Patel et al.

(10) Patent No.: US 7,211,549 B2
(45) Date of Patent: May 1, 2007

(54) SPOTTING FLUID FOR USE WITH OIL-BASED MUDS AND METHOD OF USE

(75) Inventors: Arvind Patel, Sugar Land, TX (US); Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 6 days.

(21) Appl. No.: 11/111,029

(22) Filed: Apr. 21, 2005

(65) Prior Publication Data
US 2005/0239664 A1   Oct. 27, 2005

Related U.S. Application Data

(60) Provisional application No. 60/565,488, filed on Apr. 26, 2004.

(51) Int. Cl.
C09K 8/00 (2006.01)
E21B 31/00 (2006.01)

(52) U.S. Cl. ............... 507/261; 507/266; 507/940; 166/301

(58) Field of Classification Search ........ 166/301; 507/261, 940, 266
See application file for complete search history.

(56) References Cited

U.S. PATENT DOCUMENTS

| | | | |
|---|---|---|---|
| 4,230,587 A * | 10/1980 | Walker | ............ 507/261 |
| 4,466,486 A | 8/1984 | Walker | |
| 4,494,610 A | 1/1985 | Walker | |
| 4,614,235 A | 9/1986 | Keener et al. | |
| 4,631,136 A | 12/1986 | Jones, III | |
| 4,964,615 A | 10/1990 | Mueller et al. | |
| H001000 H | 12/1991 | Patel et al. | |
| 5,120,708 A | 6/1992 | Melear et al. | |
| 5,141,920 A | 8/1992 | Bland et al. | |
| 5,247,992 A | 9/1993 | Lockhart | |
| 5,652,200 A | 7/1997 | Davies et al. | |
| 5,945,386 A | 8/1999 | Alonso-DeBolt | |
| 6,148,917 A | 11/2000 | Brookey et al. | |
| 6,267,186 B1 | 7/2001 | Hayatdavoudi | |
| 6,435,276 B1 | 8/2002 | Kercheville et al. | |
| 6,524,384 B2 | 2/2003 | Griffith et al. | |

* cited by examiner

Primary Examiner—Philip C. Tucker

(57) ABSTRACT

A method for releasing a stuck drill string in the borehole of an underground formation employing an non-aqueous drilling fluid, the illustrative method including contacting the stuck drill string with a non-emulsion based, homogeneous additive composition effective in reducing the annular pressure exerted by the drilling fluid or mud cake against the stuck drill string and releasing the stuck drill string, the additive composition formulated to include a mutual solvent and a viscosifying agent. In one illustrative embodiment the mutual solvent is a C2 to C22 glycol or a C2 to C22 glycol ether or mixtures or combinations of these and similar compounds known to one of skill in the art. Alternatively and preferably, the mutual solvent may be selected from the group consisting of: diethylene glycol, propoxy propanol, butyl cellosolve, butyl carbitol and mixtures or combinations of these and similar compounds known to one of skill in the art. A further illustrative embodiment includes a solid weighting agent, preferably the solid weighting agent is selected from the group galena, hematite, magnetite, iron oxides, illmenite, barite, siderite, celestite, dolomite, calcite, and mixtures or combinations of these and similar compounds known to one of skill in the art.

27 Claims, 2 Drawing Sheets

SPOTTING FLUID FOR USE WITH OIL-BASED MUDS AND METHOD OF USE

This is a non-provisional of co-pending U.S. Provisional Patent Application No. 60/565,488, filed Apr. 26, 2004, to which priority is claimed and the contents of which are hereby incorporated by reference.

BACKGROUND

Rotary drilling methods employing a drill bit and drill stems have long been used to drill well bores in subterranean formations. Drilling fluids or muds are commonly circulated in the well during such drilling to cool and lubricate the drilling apparatus, lift cuttings out of the well bore, and counterbalance the subterranean formation pressure encountered. The specific gravity of a well fluid is normally adjusted in such a way that the pressure of the fluid on the rock formations exceeds the formation pressure on the well. As a result, liquid components of the well fluid are forced into the formation surrounding the well while insoluble components settle on the walls of the well in the form of a stabilizing "filter cake."

In drilling a well, the path followed by the drill pipes may intentionally or unintentionally deviate from the vertical. At such consequent deviations from vertical, the rotating drill pipes may come into contact with the filter cake and even with the wall of the well. In such instances, differential jamming or sticking of the drill pipe can occur when the rotation of the drill pipe is stopped. Once differential sticking occurs, the drill sting can not be raised, lowered or rotated and the well must be either abandoned or the drill string must be unstuck. One of skill in the art will appreciate that the jamming or sticking of the drill pipe is often the result of the drill pipe being forced into the wall of the well by the hydrostatic pressure of the column of mud. The contact surface between the drill pipe and the filter cake/wall of the well is then isolated from the mud pressure. If, as is usually the case, the mud pressure is greater than the formation pressure, the drill pipe is held fast to the wall by the pressure differential. It is well known that the pressure differential increases with the thickness and compressibility of the filter cake. With time, even relatively large sections of the drill pipe can become held fast, especially in extended reach or substantially horizontal well drilling operations.

In order to free stuck pipe, prior art treatments involve the placement in and movement through the circulating mud system a volume of release agent, know as spotting fluids. Spotting fluids need a good lubricating effect and the ability to ensure good oil wettability of the surfaces of the drill pipe and of the walls of wells coming into contact with the drill pipe. One commonly used method to release stuck pipe is the use of a "spotting" fluid in the hole opposite the stuck section of pipe. The spotting fluid may penetrate between the mud cake and pipe lubricating the area between the pipe and borehole resulting in less friction and quicker release. More often than not, an extensive period of time is necessary for this to occur, which results in an expensive loss of rig time.

One of skill in the art should understand and appreciate that the formulation and use of spotting fluids in water based drilling fluids is well known. For example see U.S. Pat. Nos. 4,466,486; 4,494,610; 4,614,235; 4,631,136; 4,964,615; 5,120,708; 5,141,920; 5,247,992; 5,645,386; 5,652,200; 5,945,386; 6,435,276; 6,524,384; and H1000.

The same cannot be said for spotting fluids for use in oil based drilling fluids. Typically, when oil based drilling fluids are used differential sticking is less of a concern. However, with extended reach wells and extensive horizontal drilling, even with oil based drilling fluids, differential sticking has become a problem. Thus there remains a need for the development of environmentally friendly spotting fluids for use in oil based drilling fluids.

SUMMARY

The present disclosure is generally directed to a method for releasing a stuck drill string in the borehole of an underground formation employing an non-aqueous drilling fluid. The illustrative method includes contacting the stuck drill string with a non-emulsion based, homogeneous additive composition effective in reducing the annular pressure exerted by the drilling fluid or mud cake against the stuck drill string and releasing the stuck drill string, the additive composition formulated to include a mutual solvent and a viscosifying agent. In one illustrative embodiment the mutual solvent is a C2 to C22 glycol or a C2 to C22 glycol ether or mixtures or combinations of these and similar compounds known to one of skill in the art. Alternatively and preferably, the mutual solvent may be selected from the group consisting of: diethylene glycol, propoxy propanol, butyl cellosolve, butyl carbitol and mixtures or combinations of these and similar compounds known to one of skill in the art. A further illustrative embodiment of the disclosed subject matter includes a spotting fluid composition that further includes a solid weighting agent, preferably the solid weighting agent is selected from the group galena, hematite, magnetite, iron oxides, illmenite, barite, siderite, celestite, dolomite, calcite, and mixtures or combinations of these and similar compounds known to one of skill in the art. Alternatively, the weighting agent may be selected from the group of chemical compounds including: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures or combinations of these and similar compounds known to one of skill in the art. As a further illustrative alternative, the spotting fluid composition may include a non-emulsion forming weighting agent, such as a homogenous mixture comprising a glycol soluble salt and a glycol.

The present disclosure also encompasses a method for releasing a stuck drill string in the borehole of an underground formation drilled with a non-aqueous drilling fluid, in which the method includes contacting the stuck drill string with a non-emulsion based additive composition effective in reducing the annular pressure exerted by the drilling fluid or mud cake against the stuck drill string and thereby releasing the stuck drill string. In the present illustrative embodiment, the additive composition is formulated to include a mutual solvent and a weighting agent. As previously disclosed, the mutual solvent may be a C2 to C22 glycol or a C2 to C22 glycol ether and mixtures or combinations of these and similar compounds known to one of skill in the art. In one preferred and illustrative embodiment, the mutual solvent is selected from the group consisting of: diethylene glycol, propoxy propanol, butyl cellosolve, butyl carbitol and mixtures or combinations of these and similar compounds known to one of skill in the art. The weighting agent utilized in one illustrative embodiment is preferably a solid weighting agent selected from the group consisting of galena, hematite, magnetite, iron oxides, illmenite, barite, siderite, celestite, dolomite, calcite, and mixtures or combinations of these and similar compounds known to one of skill in the art. Alternatively, the weighting agent selected from the group of chemical compounds including: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures or combinations of these and similar compounds known to one of skill in the art. It should also be appreciated that the illustrative method may also include a weighting agent that is a non-emulsion forming fluid comprising a glycol soluble salt and a glycol. In one preferred and illustrative embodiment, such a weighting agent is a homogenous mixture of diethylene glycol and alkali metal halide salt. The illustrative spotting fluid may optionally include a viscosifying agent, preferably an organophilic clay.

Other aspects and advantages of the claimed subject matter will be apparent from the following description and the appended claims.

DETAILED DESCRIPTION

Figure 1:
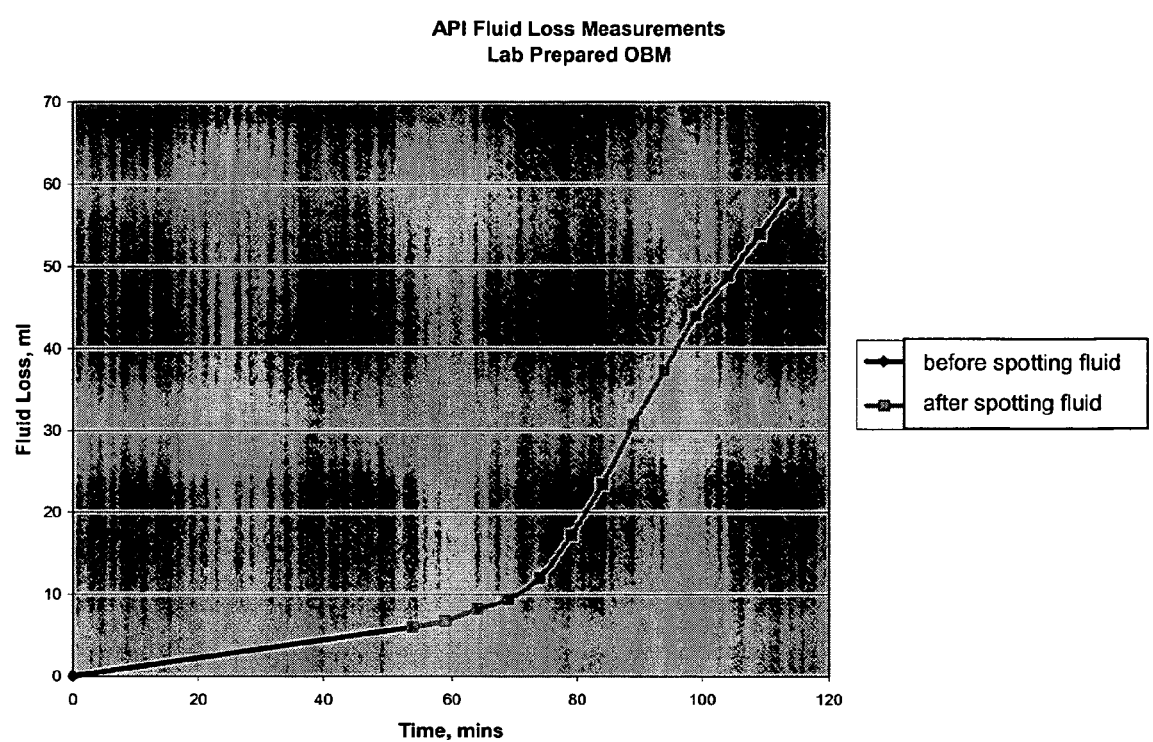
FIG. 1 is a graphical presentation of API fluid loss measurements over time before and after addition of an illustrative spotting fluid of the present disclosure.

The present disclosure is generally directed to a spotting fluid/additive for use in freeing jammed/stuck drill pipe in wells drilled with oil based drilling fluids. The present disclosure provides a new composition and method of using such composition for freeing stuck drill pipes. The composition and method are particularly useful in freeing differential stuck pipe when oil based drilling fluids and/or invert emulsion drilling fluids are in use.

The base fluid that is the primary components of the spotting fluid of the present invention should be a mutual solvent with both oleaginous and non-oleaginous fluids. That is to say, the base fluid should be at least partially and preferably substantially soluble in both oleaginous and non-oleaginous fluids. As the term is used herein, a mutual solvent has at least 10% by volume solubility in both oleaginous and non-oleaginous liquids. It is preferred that the solubility be greater than 20% by volume solubility in both oleaginous and non-oleaginous fluids. Selection of such materials can be done by routine screening of the candidate fluid by first testing the solubility of a first sample of the material in an exemplary oleaginous fluids, such as diesel, or C16–C18 isomerized olefin, and then testing the solubility of a second sample of the material in an exemplary non-oleaginous fluid, such as water. Such mutual solubility tests are generally conducted at ambient temperature and pressure. We have found that as a general class of compounds, glycols and glycol ethers have the desired solubility properties to qualify them as mutual solvents. As such, they break the filter cake resulting in an increased fluid loss into the surrounding formation, which relieves the differential pressure and results in the release or freeing-up of the stuck pipe. In one illustrative embodiment, the mutual solvent is a C2 to C22 glycol or a C2 to C22 glycol ether as well as mixtures and combinations of these and similar compounds that should be apparent to one of skill in the art. In another preferred and illustrative embodiment, the mutual solvent is selected from diethylene glycol, propoxy propanol, butyl cellosolve, butyl carbitol and mixtures and combinations of these and similar compounds that should be apparent to one of skill in the art.

In addition to the mutual solvent, the spotting fluids disclosed herein preferably include a viscosifying agent. One of skill in the art of formulating oil based drilling fluids should be aware of a wide range of viscosifying agents that may be typically utilized in oil based drilling fluids that will be useful in the formulation of the disclosed spotting fluids. In one illustrative embodiment, organophilic clays, normally amine treated clays, may be useful as viscosifiers in the fluid compositions of the disclosed subject matter. The amount of organophilic clay used in the composition should be sufficient to achieve the desired rheological properties of the present inventive spotting fluids. However, typically about 0.1% to about 20% by weight range are sufficient for most applications and preferably about 1% to about 10% by weight of viscosifying agent is utilized. VG-69 and VG-PLUS are organo-clay materials distributed by M-I L.L.C., and Versa-HRP is a polyamide resin material manufactured and distributed by M-I L.L.C., that may be used in the disclosed spotting fluids.

The spotting fluids of the present invention can contain a wide variety of additives and components typical of well bore fluids and spotting fluids specifically. Specifically, weighting agents, both water soluble and water insoluble, may be included in the formulation of the spotting fluid to impart the desired density. Weighting agents or density materials suitable for use in the described drilling fluids include galena, hematite, magnetite, iron oxides, illmenite, barite, siderite, celestite, dolomite, calcite, and the like as well as mixtures and combinations of which should be well known to one of skill in the art. Alternatively the weighting agent may be selected from the group of chemical compounds typically utilized for such purposes including: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures and combinations of which should be well known to one of skill in the art. In one illustrative embodiment, a homogenous fluid based weighting agent is formulated using a glycol and glycol soluble salt, specifically a mixture of diethylene glycol and sodium bromide is utilized as a non-emulsion forming weighting agent. One of skill in the art should appreciate that other combinations of glycols and glycol soluble salts may be used as a non-emulsion forming, fluid weighting agent. The quantity of weighting material added, if any, depends upon the desired density of the final composition. Typically, weight material is added to result in a spotting fluid density of up to about 24 pounds per gallon. The weight material is preferably added up to 21 pounds per gallon and most preferably up to 19.5 pounds per gallon.

The following examples are included as demonstrative preferred embodiments. It should be appreciated by those of skill in the art that the techniques disclosed in the examples which follow represent techniques discovered by the inventors to function well in the practice of what is claimed, and thus can be considered to constitute preferred modes of practice. However, those of skill in the art should, in light of the present disclosure, appreciate that many changes can be made in the specific embodiments which are disclosed and still obtain a like or similar result without departing from the scope of what is claimed.

Unless otherwise stated, all starting materials are commercially available and standard laboratory techniques and equipment are utilized. The tests were conducted in accordance with the procedures in API Bulletin RP 13B-2, 1990. The following abbreviations are sometimes used in describing the results discussed in the examples:

"PV" is plastic viscosity (CPS) which is one variable used in the calculation of viscosity characteristics of a drilling fluid.

"YP" is yield point (lbs/100 ft$^2$) which is another variable used in the calculation of viscosity characteristics of drilling fluids.

"GELS" (lbs/100 ft$^2$) is a measure of the suspending characteristics and the thixotropic properties of a drilling fluid.

"F/L" is API fluid loss and is a measure of fluid loss in milliliters of drilling fluid at 100 psi.

"HTHP" is the term used for high temperature high pressure fluid loss, measured in milliliters (ml) according to API bulletin RP 13 B-2, 1990.

"E.S." is electrical stability of the emulsion as measured in volts by the test described in Composition and Properties of Drilling and Completion Fluids, 5th Edition, H. C. H. Darley, George R. Gray, Gulf Publishing Company, 1988, pp. 116, the contents of which are hereby incorporated by reference. Generally, the higher the number of volts required to break the invert emulsion, the more stable the emulsion is considered.

EXAMPLE 1

The standard API fluid loss was measured for a conventional oil based mud filter cake before and after adding a variety of spotting fluids.

The following mud formulation used in the API tests:

| | |
|---|---|
| IO 16–18 | 181.58 g |
| CaCl$_2$ | 30.34 g |
| Versawet | 3 g |
| VG Plus | 4 g |
| Lime | 4 g |
| Water | 84.95 g |
| Barite | 196.14 g |

An API fluid loss of approximately 17 ml in 30 minutes was obtained using this mud formulation on API filter press.

The above mud was carefully decanted from the API filter press and replaced with spotting fluid. The API fluid loss was measured on a regular basis over a period of 100 minutes.

Exemplary results are given in the following table:

The spotting fluid formulations used in the API tests above are given in the following table:

| | | |
|---|---|---|
| S-2516A | Propoxy Propanol | 100% |
| S-2516B | Butyl Cellosolve | 50% |
| | Butyl Carbitol | 50% |
| S-2516C | Propoxy Propanol | 95% |
| | Alkaterge T-IV (Angus) | 5% |
| S-2516D | Propoxy Propanol | 95% |
| | Surfonic N-150 | 5% |
| S-2516E | Propoxy Propanol | 95% |
| | Surfonic N-95 | 5% |
| S-2516F | Propoxy Propanol | 80% |
| | Ethylene Glycol | 20% |
| S-2516G | Glycol Ether Acetate (Dowanol PMA) | 100% |
| S-2516H | Poly Ether Polyol | 50% |
| | Propoxy Propanol | 25% |
| | IO 16–18 | 25% |
| S-2516I | Tripropylene Glycol n-Butyl Ether | 100% |
| S-2516J | Dipropylene Glycol n-Butyl Ether | 100% |
| S-2516K | Pipe Lax | 100% |
| S-2516L | Tripropylene Glycol n-Butyl Ether Bottoms | 100% |

Upon review of the above data, one of skill in the art should appreciate that certain spotting fluid formulations do a better job of breaking the filter cake up and allowing fluid loss than others. As noted above, the ability of a spotting fluid to break the filter cake and allow equalization of the pressure differential is important to releasing the drill string.

EXAMPLE 2

The standard API fluid loss was measured for a conventional oil based mud filter cake before and after adding a spotting fluid formulated in accordance with the present disclosure.

The following mud formulation used in the API fluid loss test below:

| | |
|---|---|
| IO 16–18 | 181.58 g |
| CaCl$_2$ | 30.34 g |
| Versawet | 3 g |
| Versacoat | 2 g |
| VG Plus | 4 g |

API Fluid Loss Measurements in ml @ 100 psi after adding spotting fluid

| Spotting Fluid | Time, mins | | | | | | | | | | | | | | | | | |
|---|---|---|---|---|---|---|---|---|---|---|---|---|---|---|---|---|---|---|
| | 15 | 20 | 25 | 30 | 35 | 40 | 45 | 50 | 55 | 60 | 65 | 70 | 75 | 80 | 85 | 90 | 95 | 100 |
| IO16-18 | 3.0 | 3.2 | 3.8 | 4.6 | 5.0 | 5.2 | 5.8 | 6.2 | 6.6 | 7.0 | 7.4 | 7.8 | 8.0 | 8.8 | 9.0 | 9.4 | 9.4 | 10.2 |
| *S2516A | 3.4 | 3.6 | 4.0 | 4.6 | 5.2 | 6.8 | 9.6 | 12.6 | 17 | 21.8 | 28.2 | 33.8 | 43.8 | 54.6 | 60.0 | | | |
| *S2516A | 4.4 | 5.2 | 6.6 | 8.2 | 11 | 15 | 20.2 | 27.2 | 34.2 | 48.0 | 58.0 | | | | | | | |
| S2516A | 2.4 | 3.0 | 3.6 | 4.0 | 4.4 | 5.0 | 5.6 | 7.0 | 8.6 | 10.6 | 13.2 | 16.6 | 20.6 | 25.0 | 30.4 | 36.0 | 43.0 | 51.5 |
| S2516B | 3.4 | 3.6 | 4.2 | 4.7 | 5.2 | 5.4 | 6.6 | 7.6 | 9.2 | 11.2 | 14.8 | 17.2 | 22.0 | 26.3 | 29.6 | 33.0 | 36.0 | 38.2 |
| S2516C | 3.4 | 3.6 | 4.0 | 4.2 | 4.6 | 5.0 | 6.6 | 7.8 | 9.6 | 11.4 | 14.0 | 15.2 | 18.8 | 22.2 | 27.8 | 33.6 | 41.8 | 48.0 |
| S2516D | 3.0 | 3.3 | 3.8 | 3.8 | 4.0 | 4.6 | 5.4 | 5.8 | 7.2 | 8.8 | 11.0 | 12.6 | 14.0 | 15.6 | 16.4 | 19.0 | 21.6 | 23.4 |
| S2516E | 2.0 | 2.8 | 3.2 | 3.6 | 3.8 | 4.0 | 4.2 | 4.6 | 5.0 | 5.8 | 6.8 | 7.8 | 9.2 | 10.8 | 12.6 | 14.2 | 16.0 | 18.6 |
| S2516F | 2.0 | 2.8 | 3.2 | 3.4 | 3.8 | 4.0 | 4.2 | 4.6 | 5.0 | 5.8 | 6.6 | 7.6 | 8.8 | 10.0 | 11.6 | 13.0 | 14.6 | 17.0 |
| S2516G | 2.0 | 2.8 | 3.0 | 3.4 | 3.8 | 4.0 | 4.4 | 4.8 | 5.2 | 6.6 | 7.6 | 9.0 | 11.2 | 14.0 | 17.8 | 21.2 | 25.6 | 29.8 |
| S2516H | 2.0 | 2.8 | 3.2 | 3.6 | 4.0 | 4.2 | 4.6 | 4.7 | 4.8 | 5.0 | 5.0 | 5.0 | 5.2 | 5.2 | 5.4 | 5.6 | 5.6 | |
| *S2516I | 2.0 | 2.2 | 2.6 | 2.8 | 3.0 | 3.2 | 4.0 | 5.0 | 6.2 | 6.6 | 9.0 | 10 | 11.0 | 12.6 | 13.8 | 15.0 | 16.4 | 17.8 |
| *S2516J | 2.2 | 2.8 | 3.4 | 4.2 | 4.8 | 5.8 | 7.0 | 8.4 | 9.6 | 10.8 | 12.6 | 13.8 | 15.8 | 17.6 | 20.0 | 22.6 | 24.8 | 27.0 |
| *S2516K | 1.6 | 2.0 | 2.4 | 2.8 | 3.0 | 3.0 | 3.0 | 3.2 | 3.4 | 3.4 | 3.8 | 4.0 | 4.0 | 4.2 | 4.6 | 4.8 | 5.0 | 5.0 |
| *S2516L | 2.0 | 2.6 | 2.8 | 3.0 | 3.0 | 3.2 | 3.2 | 3.4 | 3.8 | 4.0 | 4.2 | 4.6 | 4.6 | 5.0 | 5.0 | 5.4 | 5.4 | 5.4 |

*cleaned filter cake with isomerized olefin C16–18 before adding in spotting fluid.

| | |
|---|---|
| Lime | 4 g |
| Water | 84.95 g |
| Barite | 196.14 g |

The measured API fluid loss was approximately 6 ml in 67 minutes using this mud formulation on API filter press.

The above mud was carefully decanted from the API filter press and the following spotting fluid was added.

| | |
|---|---|
| Propoxy Propanol | 200 g |
| EMI-569 (organophilic clay distributed by M-I L.L.C.) | 20 g |

The API fluid loss was measured on a regular basis over a period of 45 minutes, the following table provides exemplary results:

API Fluid Loss Measurements in ml @ 100 psi after adding Spotting Fluid A

| Time, mins | | | | | | | | | | | | |
|---|---|---|---|---|---|---|---|---|---|---|---|---|
| 4 | 5 | 6 | 7 | 8 | 9 | 10 | 15 | 20 | 25 | 30 | 35 | 40 | 45 |
| 2.2 | 2.6 | 3 | 3.4 | 3.8 | 4.2 | 4.5 | 6.2 | 7.6 | 9.8 | 13 | 17 | 23 | 31 |

Upon review of the above data, one of skill in the art should appreciate that the spotting fluid formulation appears to be breaking the filter cake up and allowing fluid loss. As noted above, the ability of a spotting fluid to break the filter cake and allow equalization of the pressure differential is important to a releasing the drill string.

EXAMPLE 3

The High Temperature, High Pressure (HTHP) fluid loss was measured for a conventionally formulated oil-based drilling fluid using standard and well known methods. The HTHP fluid loss was measured in volume of fluid that passed through the filtercake at 500 psi, and 150° F. The filter cake was built up on a 10 micron ceramic filter disk which absent a filter cake allows solids free fluid to easily pass through.

The following mud formulation used in the HTHP test below:

| | |
|---|---|
| IO 16–18 | 181.58 g |
| $CaCl_2$ | 30.34 g |
| Versawet | 3 g |
| Versacoat | 2 g |
| VG Plus | 4 g |
| Lime | 4 g |
| Water | 84.95 g |
| Barite | 196.14 g |

Fluid loss of approximately 8 ml in 55 minutes was observed with this mud formulation on HTHP filter press (Building cake).

The above mud was carefully decanted from the API filter press and the following spotting fluid was added.

| | |
|---|---|
| Propoxy Propanol | 200 g |
| EMI-569 | 20 g |

The HTHP fluid loss was measured on a regular basis over a period of 20 minutes, the following table provides exemplary results:

HTHP Fluid Loss in ml @ 500 psi, @ 150° F. using 10 micron ceramic filter disk after adding spotting fluid

| Time, mins | | | | | |
|---|---|---|---|---|---|
| 5 | 10 | 12 | 14 | 16 | 18 | 20 |
| 3 | 9.2 | 12 | 15 | 18.5 | 22 | 25 |

Upon review of the above data, one of skill in the art should appreciate that the spotting fluid formulation appears to be breaking the filter cake up and allowing fluid loss. As noted above, the ability of a spotting fluid to break the filter cake and allow equalization of the pressure differential is important to releasing the drill string.

EXAMPLE 4

The High Temperature, High Pressure (HTHP) fluid loss was measured for a conventionally formulated oil-based drilling fluid using standard and well known methods. The HTHP fluid loss was measured in volume of fluid that passed through the filtercake at 500 psi, and 150° F. The filter cake was built up on a 10 micron ceramic filter disk which absent a filter cake allows solids free fluid to easily pass through.

The following mud formulation used in the HTHP test below:

| | |
|---|---|
| IO 16–18 | 181.58 g |
| $CaCl_2$ | 30.34 g |
| Versawet | 3 g |
| Versacoat | 2 g |
| VG Plus | 4 g |
| Lime | 4 g |
| Water | 84.95 g |
| Barite | 196.14 g |

Fluid loss of approximately 8 ml in 71 minutes was observed with this mud formulation on HTHP filter press (Building cake).

The above mud was carefully decanted from the API filter press and the following spotting fluid was added.

| | |
|---|---|
| Propoxy Propanol | 255 g |
| Diethylene glycol (DEG) | 200 g |
| NaBr | 55 g |

The HTHP fluid loss was measured on a regular basis over a period of 20 minutes, the following table provides exemplary results:

| HTHP Fluid Loss in ml @ 500 psi, @ 150° F. using 10 micron ceramic filter disk after adding spotting fluid | | | | | | | | | | |
|---|---|---|---|---|---|---|---|---|---|---|
| 5 | 10 | 20 | 25 | 30 | 35 | 40 | 45 | 50 | 55 | 60 |
| 10 | 18 | 33 | 38.5 | 41 | 43 | 45 | 45.5 | 49 | 49.5 | 50 |

Upon review of the above data, one of skill in the art should appreciate that the spotting fluid formulation appears to be breaking the filter cake up and allowing fluid loss. As noted above, the ability of a spotting fluid to break the filter cake and allow equalization of the pressure differential is important to releasing the drill string.

EXAMPLE 5

A test was conducted to determine if addition of spotting fluid will cause adverse problems when added to a diesel-based field mud to free stuck pipe. A conventionally formulated diesel oil-based field mud was formulated and exhibited the following properties

| Mud Properties | Value |
|---|---|
| Mud Weight, ppg | 12.3 |
| Rheo Temp, ° F. | 150 |
| 600 rpm | 50 |
| 300 rpm | 29 |
| 200 rpm | 19 |
| 100 rpm | 12 |
| 6 rpm | 6 |
| 3 rpm | 6 |
| PV, cps | 21 |
| YP, lbs/100 ft$^2$ | 8 |
| 10 Second Gel | 15 |
| 10 Minute Gel | 29 |
| HTHP @ 300° F., ml | 2.8 |
| E.S., Vts | 587 |
| Excess Lime, ppb | 3.88 |
| Solids, % by Vol | 19.0 |
| Oil, % by Vol | 63.5 |
| Water, % by Vol | 17.5 |
| Oil/Water Ratio | 78.4/21.6 |

Spotting fluid formulations used in this test are provided in the following table:

| Spotting Fluid A | Propoxy Propanol | 255 g |
|---|---|---|
| | Diethylene glycol | 200 g |
| | NaBr | 55 g |
| Spotting Fluid B | Propoxy Propanol | 100% |

Electrical stability (ES) measurements were conducted on the base mud and on the base mud after various concentrations of spotting fluid A and spotting fluid B were added. Electrical stability is a standard method utilized to measure the relative stability of oil based drilling muds. The test measure the voltage required to break the emulsion between a standard electrode configuration. Such tests should be well known to one of skill in the art of drilling fluid formulation and testing. Electrical stability measurements were done on samples containing 1%, 2%, 3%, 4% and 5% by volume of the tested spotting fluid. The following table presents exemplary data:

| | 1% | 2% | 3% | 4% | 5% |
|---|---|---|---|---|---|
| Base (ES = 530) | — | — | — | — | — |
| Spotting Fluid A | 565 | 524 | 507 | 521 | 579 |
| Spotting Fluid B | 516 | 537 | 585 | 606 | 800 |

In addition to the above test, a drilling fluid sample containing a 5% vol. concentrations of the spotting fluids to base field mud were measured for rheology and ES initially and after heat-aging for 16 hours @150° F. The following tables present exemplary data:

| | 600/300 | 200/100 | 6/3 | 10 sec/10 min | PV/YP | ES |
|---|---|---|---|---|---|---|
| Initial - Rheology @ 120° F. | | | | | | |
| Base | 58/33 | 24/15 | 6/6 | 16/34 | 25/8 | 530 |
| 5% Spotting Fluid A | 50/27 | 19/11 | 5/5 | 15/38 | 23/4 | 579 |
| 5% Spotting Fluid B | 53/28 | 19/11 | 5/5 | 15/37 | 25/3 | 800 |
| Heat-aged @ 150° F. - 16 hrs - Rheology @ 120° F. | | | | | | |
| Base | 52/30 | 22/14 | 6/6 | 13/46 | 22/8 | 848 |
| 5% Spotting Fluid A | 49/29 | 21/13 | 5/4 | 12/36 | 20/9 | 525 |
| 5% Spotting Fluid B | 50/26 | 19/12 | 6/5 | 12/35 | 24/2 | 702 |

Upon review of the above exemplary data one of skill in the art should appreciate that there were no major changes in rheology and ES (electrical stability) of the mud after additions of the spotting fluid. One of skill in the art should appreciate that the two spotting fluid formulations appear to be compatible with the field mud tested.

EXAMPLE 6

A test was conducted to determine if addition of spotting fluid will cause adverse problems when added to a synthetic oil-based field mud to free stuck pipe. A conventionally formulated synthetic oil based field mud having the following properties:

| Mud Properties | |
|---|---|
| Mud Weight, ppg | 15.61 |
| Solids, % by Vol | 33.5 |
| Synthetic, % by Vol | 54.5 |
| Water, % by Vol | 12.0 |
| Synthetic/Water Ratio | 82.0/18.0 |
| Excess Lime, ppb | 6.09 |
| HTHP @ 300° F., ml | 3.0 |
| E.S., Vts | 979 |

| | Rheo Temp, ° F. | | |
|---|---|---|---|
| | 80 | 120 | 150 |
| 600 rpm | 175 | 118 | 90 |
| 300 rpm | 103 | 70 | 54 |
| 200 rpm | 76 | 53 | 41 |
| 100 rpm | 48 | 35 | 27 |
| 6 rpm | 14 | 12 | 10 |
| 3 rpm | 13 | 11 | 9 |
| PV, cps | 72 | 48 | 36 |
| YP, lbs/100 ft2 | 31 | 22 | 18 |

-continued

| Mud Properties | | | |
|---|---|---|---|
| 10 Second Gel | 17 | 15 | 12 |
| 10 Minute Gel | 30 | 24 | 19 |

Spotting fluid formulations used in this test are provided in the following table:

| Spotting Fluid A | Propoxy Propanol | 255 g |
|---|---|---|
| | Diethylene glycol | 200 g |
| | NaBr | 55 g |
| Spotting Fluid B | Propoxy Propanol | 100% |

The drilling fluid sample containing a 5% volume concentrations of the spotting fluids to base field mud were measured for rheology and ES initially and after heat-aging for 16 hours @150° F. The following tables present exemplary data:

| | 600/300 | 200/100 | 6/3 | 10 sec/10 min | PV/YP | ES |
|---|---|---|---|---|---|---|
| Initial - Rheology @ 120° F. | | | | | | |
| Base | 115/67 | 51/34 | 12/12 | 16/25 | 48/19 | 1050 |
| 5% Spotting Fluid A | 100/56 | 42/26 | 7/6 | 8/15 | 44/12 | 610 |
| 5% Spotting Fluid B | 84/48 | 35/21 | 6/5 | 8/13 | 36/12 | 458 |
| Heat-aged @ 150° F. - 16 hrs - Rheology @ 120° F. | | | | | | |
| Base | 110/64 | 49/32 | 13/11 | 15/25 | 46/18 | 1048 |
| 5% Spotting Fluid A | 92/51 | 37/23 | 6/5 | 8/14 | 41/10 | 321 |
| 5% Spotting Fluid B | 83/46 | 33/20 | 5/5 | 8/13 | 37/9 | 337 |

In view of the above results, one of skill in the art will appreciate that there were no major changes in rheology and ES (electrical stability) of the mud after additions of the spotting fluid. One of skill in the art should appreciate that the two spotting fluid formulations appear to be compatible with the field mud tested.

EXAMPLE 7

The standard API fluid loss was measured for a conventional oil based mud filter cake before and after adding a spotting fluid formulated in accordance with the present disclosure.

The following mud formulation used in the API fluid loss test below:

| Lab Prepared OBM | |
|---|---|
| IO 16–18 | 181.58 g |
| CaCl$_2$ | 30.34 g |
| Versawet | 3 g |
| Versacoat | 2 g |
| VG Plus | 4 g |
| Lime | 4 g |
| Water | 84.95 g |
| Barite | 196.14 g |

After a period of about 90 minutes, the above mud was carefully decanted from the API filter press and the following spotting fluid was added:

| Butyl Carbitol | 93% by wt |
|---|---|
| VG Supreme (organophilic clay) | 7% by wt |

The fluid loss was then collected and measured over time. A graphical representation of exemplary data is given in FIG. 1.

Upon review of the above data, one of skill in the art should appreciate that the spotting fluid formulation appears to be breaking the filter cake up and allowing fluid loss. As noted above, the ability of a spotting fluid to break the filter cake and allow equalization of the pressure differential is important to un-sticking the drill string.

EXAMPLE 8

The High Temperature, High Pressure (HTHP) fluid loss was measured for a conventionally formulated oil-based drilling fluid using standard and well known methods. The HTHP fluid loss was measured in volume of fluid that passed through the filtercake at 500 psi, and 150° F. The filter cake was built up on a 10 micron ceramic filter disk which absent a filter cake allows solids free fluid to easily pass through.

The following mud formulation used in the HTHP fluid loss test below:

| Lab Prepared OBM | |
|---|---|
| IO 16–18 | 181.58 g |
| CaCl$_2$ | 30.34 g |
| Versawet | 3 g |
| Versacoat | 2 g |
| VG Plus | 4 g |
| Lime | 4 g |
| Water | 84.95 g |
| Barite | 196.14 g |

After a period of about 90 minutes, the above mud was carefully decanted from the API filter press and the following spotting fluid was added:

| Butyl Carbitol | 93% by wt |
|---|---|
| VG Supreme (organophilic clay) | 7% by wt |

Figure 2:
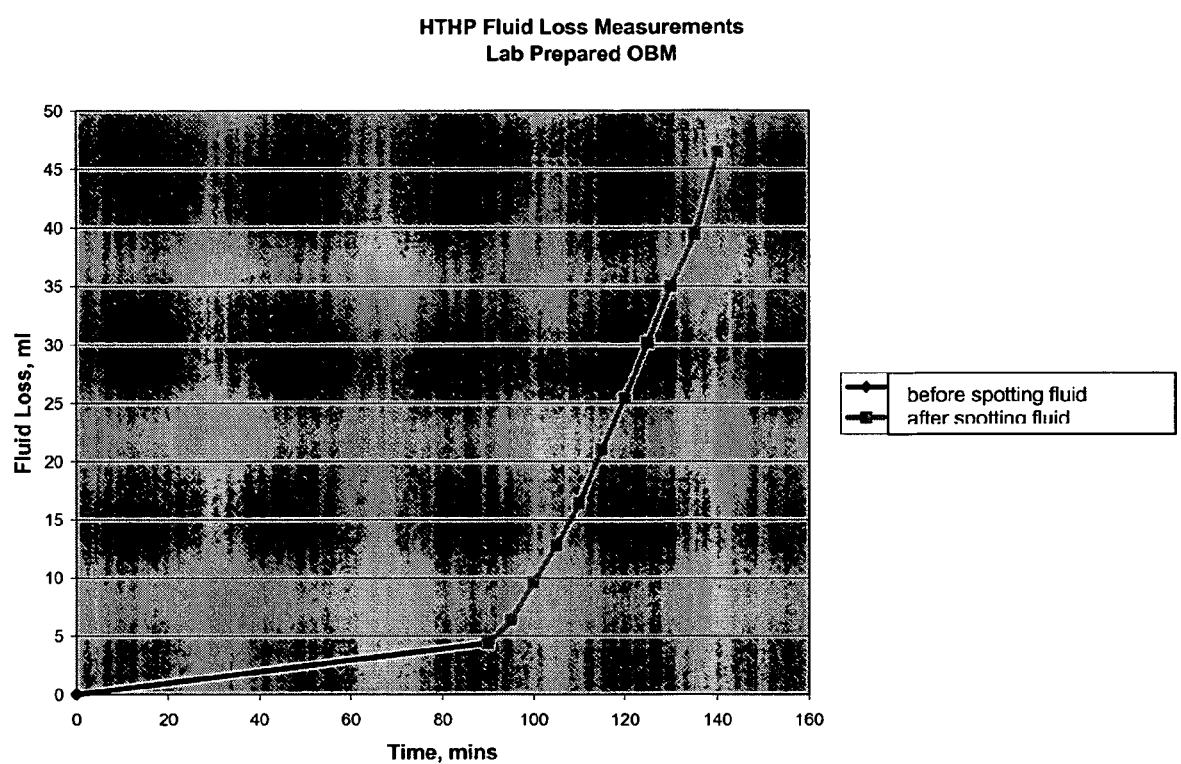
FIG. 2 is a graphical presentation of API fluid loss measurements over time before and after addition of an illustrative spotting fluid of the present disclosure.

The fluid loss was then collected and measured over time. A graphical representation of exemplary data is given in FIG. 2.

Upon review of the above data, one of skill in the art should appreciate that the spotting fluid formulation appears to be breaking the filter cake up and allowing fluid loss. As noted above, the ability of a spotting fluid to break the filter cake and allow equalization of the pressure differential is important to un-sticking the drill string.

In view of the above disclosure, one of skill in the art should appreciate the that one aspect of the claimed subject matter includes a method for releasing a stuck drill string in the borehole of an underground formation employing an non-aqueous drilling fluid. The illustrative method includes contacting the stuck drill string with a non-emulsion based, homogeneous additive composition effective in reducing the annular pressure exerted by the drilling fluid or mud cake against the stuck drill string and releasing the stuck drill string, the additive composition formulated to include a mutual solvent and a viscosifying agent. In one illustrative embodiment the mutual solvent is a C2 to C22 glycol or a C2 to C22 glycol ether or mixtures or combinations of these and similar compounds known to one of skill in the art. Alternatively and preferably, the mutual solvent may be selected from the group consisting of: diethylene glycol, propoxy propanol, butyl cellosolve, butyl carbitol and mixtures or combinations of these and similar compounds known to one of skill in the art. A further illustrative embodiment of the disclosed subject matter includes a spotting fluid composition that further includes a solid weighting agent, preferably the solid weighting agent is selected from the group galena, hematite, magnetite, iron oxides, illmenite, barite, siderite, celestite, dolomite, calcite, and mixtures or combinations of these and similar compounds known to one of skill in the art. Alternatively, the weighting agent may be selected from the group of chemical compounds including: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures or combinations of these and similar compounds known to one of skill in the art. As a further illustrative alternative, the spotting fluid composition may include a non-emulsion forming weighting agent, such as a homogenous mixture comprising a glycol soluble salt and a glycol.

The present disclosure and the claimed subject matter also encompasses a method for releasing a stuck drill string in the borehole of an underground formation drilled with an non-aqueous drilling fluid, in which the method includes contacting the stuck drill string with a non-emulsion based additive composition effective in reducing the annular pressure exerted by the drilling fluid or mud cake against the stuck drill string and thereby releasing the stuck drill string. In the present illustrative embodiment, the additive composition is formulated to include a mutual solvent and a weighting agent. As previously disclosed, the mutual solvent may be a C2 to C22 glycol or a C2 to C22 glycol ether and mixtures or combinations of these and similar compounds known to one of skill in the art. In one preferred and illustrative embodiment, the mutual solvent is selected from the group consisting of: diethylene glycol, propoxy propanol, butyl cellosolve, butyl carbitol and mixtures or combinations of these and similar compounds known to one of skill in the art. The weighting agent utilized in one illustrative embodiment is preferably a solid weighting agent selected from the group consisting of galena, hematite, magnetite, iron oxides, illmenite, barite, siderite, celestite, dolomite, calcite, and mixtures or combinations of these and similar compounds known to one of skill in the art. Alternatively, the weighting agent selected from the group of chemical compounds including: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures or combinations of these and similar compounds known to one of skill in the art. It should also be appreciated that the illustrative method may also include a weighting agent that is a non-emulsion forming fluid comprising a glycol soluble salt and a glycol. In one preferred and illustrative embodiment, such a weighting agent is a homogenous mixture of diethylene glycol and alkali metal halide salt. The illustrative spotting fluid may optionally include a viscosifying agent, preferably an organophilic clay.

Alternatively the claimed subject matter includes a method for releasing a stuck drill string in the borehole of an underground formation which has been drilled with an non-aqueous drilling fluid. The illustrative method includes contacting the stuck drill string with a spotting fluid composition that is effective in reducing the annular pressure exerted by the drilling fluid or mud cake against the stuck drill string and thereby releasing the stuck drill string. The spotting fluid composition of the present illustrative embodiment is formulated to include a mutual solvent selected from the group consisting of diethylene glycol, propoxy propanol, butyl cellosolve, butyl carbitol and mixtures and combinations thereof; a viscosifying agent; and a weighting agent. In one preferred and illustrative embodiment, the viscosifying agent is an organophilic clay or other similar viscosifying agent utilized in building rheology in oleaginous fluids. The weighting agent utilized may be selected from a variety of a solid weighting agents including galena, hematite, magnetite, iron oxides, illmenite, barite, siderite, celestite, dolomite, calcite, and mixtures or combinations of these and similar compounds known to one of skill in the art. Alternatively, the weighting agent selected from the group of chemical compounds including: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures or combinations of these and similar compounds known to one of skill in the art. It should also be appreciated that the illustrative method may also include a weighting agent that is a non-emulsion forming fluid comprising a glycol soluble salt and a glycol. In one preferred and illustrative embodiment, such a weighting agent is a homogenous mixture of diethylene glycol and alkali metal halide salt. The illustrative spotting fluid may optionally include a viscosifying agent, preferably an organophilic clay.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A method for releasing a stuck drill string in the borehole of an underground formation employing an non-aqueous drilling fluid, the method comprising contacting the stuck drill string with a non-emulsion based, homogeneous additive composition effective in reducing the annular pressure exerted by the drilling fluid or mud cake against the stuck drill string and thereby releasing the stuck drill string, the additive composition comprising a mutual solvent selected from the group consisting of $C_2$ to $C_{22}$ glycols and a viscosifying agent.

2. The method of claim 1 wherein the mutual solvent is ethylene glycol, diethylene glycol, or mixtures of these.

3. The method of claim 1, wherein the mutual solvent is ethylene glycol.

4. The method of claim 1, wherein the viscosifying agent is an organophilic clay.

5. The method of claim 1 wherein the composition additionally comprises a solid weighting agent selected from the group consisting of galena, hematite, magnetite, iron oxides, ilimenite, barite, siderite, celestite, dolomite, calcite, and mixtures and combinations thereof.

6. The method of claim 1 wherein the composition additionally comprises a weighting agent selected from the group: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures and combinations thereof.

7. The method of claim 1 wherein the composition includes a non-emulsion forming weighting agent comprising a glycol soluble salt and a glycol.

8. A method for releasing a stuck drill string in the borehole of an underground formation employing an non-aqueous drilling fluid, the method comprising contacting the stuck drill string with a non-emulsion based additive composition effective in reducing the annular pressure exerted by the drilling fluid or mud cake against the stuck drill string and thereby releasing the stuck drill string, the additive composition comprising a mutual solvent selected from the group consisting of $C_2$ to $C_{22}$ glycols and a weighting agent.

9. The method of claim 8 wherein the mutual solvent is ethylene glycol, diethylene glycol, or mixtures of these.

10. The method of claim 8, wherein the mutual solvent is ethylene glycol.

11. The method of claim 8, further comprising a viscosifying agent.

12. The method of claim 11, wherein the viscosifying agent is an organophilic clay.

13. The method of claim 8 wherein weighting agent is a solid weighting agent selected from the group consisting of galena, hematite, magnetite, iron oxides, jilmenite, barite, siderite, celestite, dolomite, calcite, and mixtures and combinations thereof.

14. The method of claim 8 wherein the weighting agent selected from the group: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures and combinations thereof.

15. The method of claim 8 wherein the weighting agent is a non-emulsion forming fluid comprising a glycol soluble salt and a glycol.

16. A method for releasing a stuck drill string in the borehole of an underground formation employing an non-aqueous drilling fluid, the method comprising contacting the stuck drill string with a composition effective in reducing the annular pressure exerted by the drilling fluid or mud cake against the stuck drill string and thereby releasing the stuck drill string, the additive composition comprising: a mutual solvent selected from the group consisting of ethylene glycol, diethylene glycol, and mixtures and combinations thereof; a viscosifying agent and a weighting agent.

17. The method of claim 16, wherein the viscosifying agent is an organophilic clay.

18. The method of claim 16 wherein the weighting agent is a solid weighting agent selected from the group consisting of galena, hematite, magnetite, iron oxides, illmenite, barite, siderite, celestite, dolomite, calcite, and mixtures and combinations thereof.

19. The method of claim 16 wherein the weighting agent selected from the group: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures and combinations thereof.

20. The method of claim 16 wherein the weighting agent is a non-emulsion forming fluid comprising a glycol soluble salt and a glycol.

21. A method for releasing a stuck drill string in the borehole of an underground formation employing an non-aqueous drilling fluid, the method comprising contacting the stuck drill string with a non-emulsion based, homogeneous additive composition effective in reducing the annular pressure exerted by the drilling fluid or mud cake against the stuck drill string and thereby releasing the stuck drill string, the additive composition comprising a mutual solvent and a viscosifying agent, wherein the viscosifying agent is an organophilic clay.

22. The method of claim 21 wherein the mutual solvent a $C_2$ to $C_{22}$ glycol or a $C_2$ to $C_{22}$ glycol ether or mixtures of these.

23. The method of claim 21, wherein the mutual solvent is selected from the group consisting of: diethylene glycol, propoxy propanol, butyl cellosolve, butyl carbitol and mixtures and combinations thereof.

24. The method of claim 21 wherein the composition additionally comprises a weighting agent.

25. The method of claim 21 wherein the composition additionally comprises a solid weighting agent selected from the group consisting of galena, hematite, magnetite, iron oxides, illmenite, barite, siderite, celestite, dolomite, calcite, and mixtures and combinations thereof.

26. The method of claim 21 wherein the composition additionally comprises a weighting agent selected from the group: barium sulfate; iron oxide, cesium salts of halide, formate, acetate, and nitrate; sodium salts of halide, formate and acetate; potassium salts of halide, formate and acetate; calcium salts of halide, carbonate, formate, acetate, and nitrate; and mixtures and combinations thereof.

27. The method of claim 21 wherein the composition includes a non-emulsion forming weighting agent comprising a glycol soluble salt and a glycol.

* * * * *